United States Patent
Liang et al.

(10) Patent No.: US 12,349,260 B2
(45) Date of Patent: Jul. 1, 2025

(54) WIRELESS LAMP SYSTEM WITH INFRARED CODING FUNCTION

(71) Applicant: Guangzhou Rising Dragon Recreation Industrial Co., Ltd., Guangzhou (CN)

(72) Inventors: Bo Liang, Guangzhou (CN); Ziqin Guo, Guangzhou (CN)

(73) Assignee: GUANGZHOU RISING DRAGON RECREATION INDUSTRIAL CO., LTD., Guangzhou (CN)

(*) Notice: Subject to any disclaimer, the term of this patent is extended or adjusted under 35 U.S.C. 154(b) by 140 days.

(21) Appl. No.: 18/491,826

(22) Filed: Oct. 23, 2023

(65) Prior Publication Data
US 2024/0224405 A1    Jul. 4, 2024

(30) Foreign Application Priority Data
Dec. 30, 2022 (CN) .......................... 202211724326.X

(51) Int. Cl.
| H05B 45/30 | (2020.01) |
| H05B 45/325 | (2020.01) |
| H05B 47/10 | (2020.01) |
| H05B 47/195 | (2020.01) |

(52) U.S. Cl.
CPC ......... H05B 47/195 (2020.01); H05B 45/325 (2020.01)

(58) Field of Classification Search
CPC ...... H05B 45/10; H05B 45/30; H05B 45/325; H05B 47/10; H05B 47/19; H05B 47/195
See application file for complete search history.

(56) References Cited

U.S. PATENT DOCUMENTS 9,504,099 B2 * 11/2016 McGuire .............. H05B 47/196

FOREIGN PATENT DOCUMENTS

CN            103781262 A  *  5/2014    .......... H05B 33/086

* cited by examiner

*Primary Examiner* — Jimmy T Vu
(74) *Attorney, Agent, or Firm* — Andrew C. Cheng

(57) ABSTRACT

A wireless lamp system with an infrared coding function comprises a wireless lamp, a lamp holder and an encoder. The wireless lamp comprises an LED lamp bead, an LED drive module, a first control module, an infrared signal receiving module and a wireless power receiving module. The lamp holder is electrically connected to an external power supply, and comprises a first wireless power transmitting module, a first infrared signal transmitting module and a second control module. The encoder comprises a power supply module, and a second wireless power transmitting module, a second infrared signal transmitting module and a third control module. The encoder equipped with the infrared signal transmitting module is used for writing corresponding codes, and the infrared coded signal with coding information is transmitted to the wireless lamp change the protocol quickly, such that the wireless lamp system is more universal and more convenient to use.

6 Claims, 4 Drawing Sheets

WIRELESS LAMP SYSTEM WITH INFRARED CODING FUNCTION

FIELD

The application relates to the field of lamps, in particular to a wireless lamp system with an infrared coding function.

BACKGROUND

During using of lamps, controllers provided by different manufacturers can only control corresponding LED lamps, and when controllers are changed, the lamps need to be changed accordingly. To make one lamp to be adapted to controllers provided by different manufacturers and reduce the use cost, it is necessary to integrate multiple manufacturer controller protocols into one lamp, such that the corresponding manufacturer controller protocol can be selected by changing the configuration of the LED lamp. A wireless lamp system with an infrared coding function is provided to allow the configuration of lamps to be changed easily.

SUMMARY

In view of the problems in the prior art, the application provides a wireless lamp system with an infrared coding function, which is designed in such a manner that an infrared signal receiving module is added to a lamp, an encoder equipped with an infrared signal transmitting module is used, and infrared coding information is transmitted to the lamp to write corresponding codes to select a corresponding manufacturer protocol.

In one aspect, the application provides a wireless lamp system with an infrared coding function, comprising a wireless lamp, a lamp holder and an encoder, the lamp holder being configured for supplying power to the wireless lamp and transmitting an infrared control signal to drive the wireless lamp to change emitted light, the encoder being configured for sending an infrared coded signal, and the wireless lamp analysing the infrared coded signal and then selectively changing a manufacturer protocol to analyse the infrared control signal received from the lamp holder, wherein:

the wireless lamp comprises an LED lamp bead, an LED drive module, a first control module, an infrared signal receiving module and a wireless power receiving module, the infrared signal receiving module is matched with the first control module to receive and analyse the infrared control signal/infrared coded signal transmitted from the lamp holder/encoder, the first control module outputs a PWM control signal or changes the manufacturer protocol according to an analysis result, and the LED drive module receives the PWM control signal to drive the LED lamp bead to change emitted light;

the lamp holder is electrically connected to an external power supply, and comprises a first wireless power transmitting module, a first infrared signal transmitting module and a second control module, the first wireless power transmitting module is matched with the wireless power receiving module to activate the wireless lamp, and the second control module converts a light control signal into the infrared control signal and then transmits the infrared control signal to the wireless lamp through the first infrared signal transmitting module;

the encoder comprises a power supply module, and a second wireless power transmitting module, a second infrared signal transmitting module and a third control module which are electrically connected to the power supply module, the second wireless power supply module is matched with the wireless power receiving module to activate the wireless lamp, protocol selection signals are preset in the third control module, and the third control module transmits one protocol selection signal to the wireless lamp in the form of the infrared coded signal through the second infrared signal transmitting module.

Preferably, wherein the encoder is provided with a preset number of functional buttons, and each of the functional buttons is linked with the third control module and correspondingly outputs one protocol selection signal preset in the third control module.

Preferably, wherein manufacturer protocols in one-to-one correspondence with the protocol selection signals are preset in the first control module of the wireless lamp, and the first control module selects the corresponding manufacturer protocol according to the protocol selection signal analysed from the infrared coded signal.

Preferably, wherein the lamp holder is electrically connected to a controller, and the controller is used for compiling and transmitting the light control signal.

Preferably, wherein the infrared coded signal comprises a data head, data and verification data.

Preferably, the data head comprises three continuous pulses, and each of the pulses sequentially comprises a 60 ms high level and a 60 ms low level.

The wireless lamp system with an infrared coding function provided by the application has the following beneficial effects:

According to the wireless lamp system with an infrared coding function, multiple manufacturer controller protocols are integrated in one wireless lamp, and the corresponding manufacturer protocol is selected by changing the configuration of the LED lamp. Specifically, the infrared signal receiving module is configured in the wireless lamp, the encoder equipped with the infrared signal transmitting module is used for writing corresponding codes, an infrared coded signal with coding information is transmitted to the wireless lamp, the wireless lamp analyses the infrared coded signal through the first control module and selects the corresponding manufacturer protocol according to the analysis result to realize quick change of the protocol, such that the wireless lamp system is more universal and more convenient to use.

DESCRIPTION OF THE EMBODIMENTS

A wireless lamp system with an infrared coding function provided by the invention will be further described below in conjunction with the accompanying drawings. It should be pointed out that the technical solution and design principle of the invention are expounded below with reference to an optimal technical solution.

It should be noted that, in the whole description of the invention, nouns of locality such as terms including "centre", "crosswise", "lengthwise", "lateral", "length", "width", "thickness", "upper", "lower", "front", "back", "left", "right", "vertical", "perpendicular". "horizontal", "top", "bottom", "inner", "outer", "clockwise" and "anticlockwise" are used to indicate directional or positional relationships based on the accompanying drawings or to indicate directional or positional relationships commonly known by those skilled in the art merely for facilitating and simplifying the description of the invention, and do not imply that a device or element referred to must be in a specific direction, or be constructed and operated by a specific direction, so they should not be construed as limiting the specific protection scope of the invention.

Figure 1:
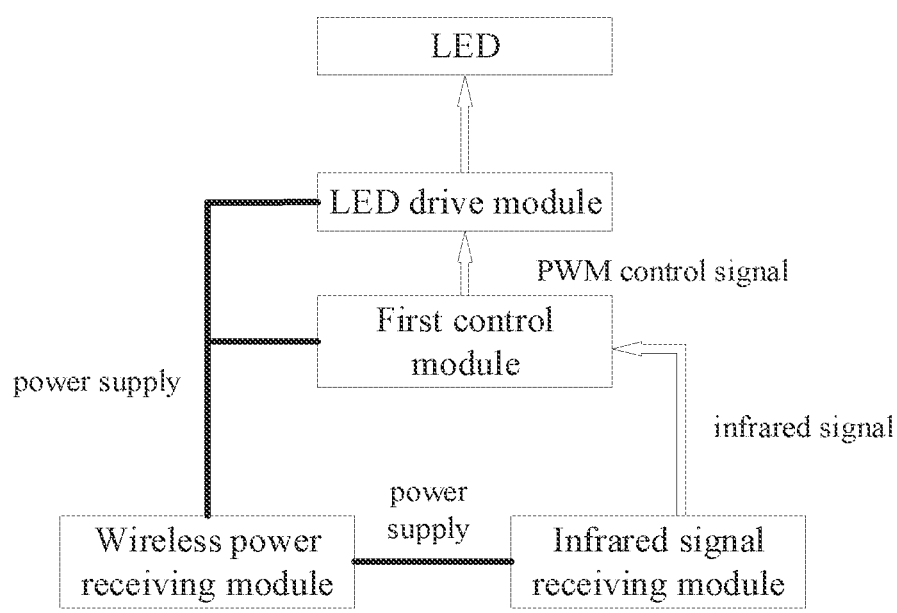
FIG. 1 is a structural diagram of a wireless lamp of a wireless lamp system with an infrared coding function provided by a first embodiment of the application.
Figure 2:
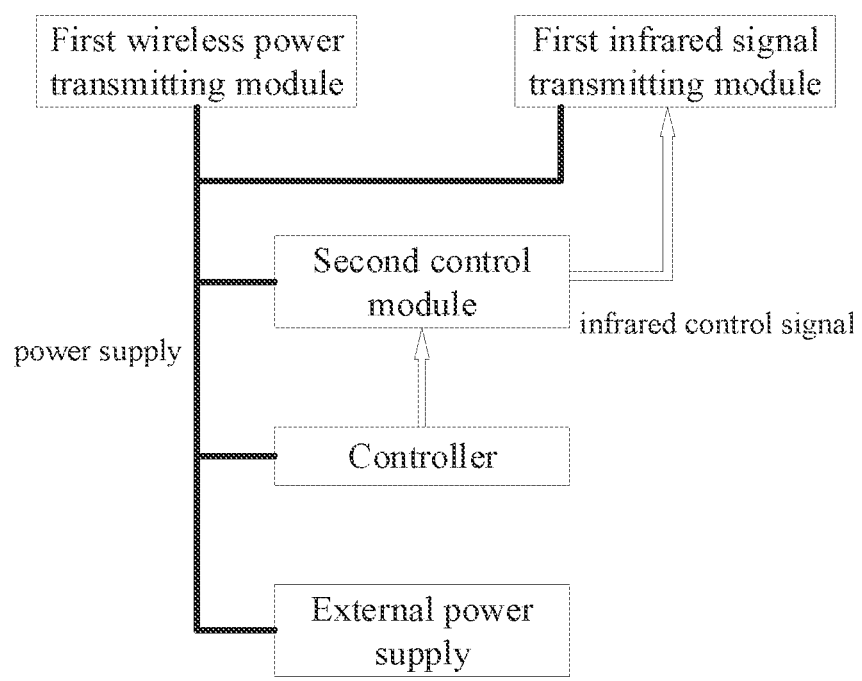
FIG. 2 is a structural diagram of a lamp holder of the wireless lamp system with an infrared coding function provided by the first embodiment of the application.
Figure 3:
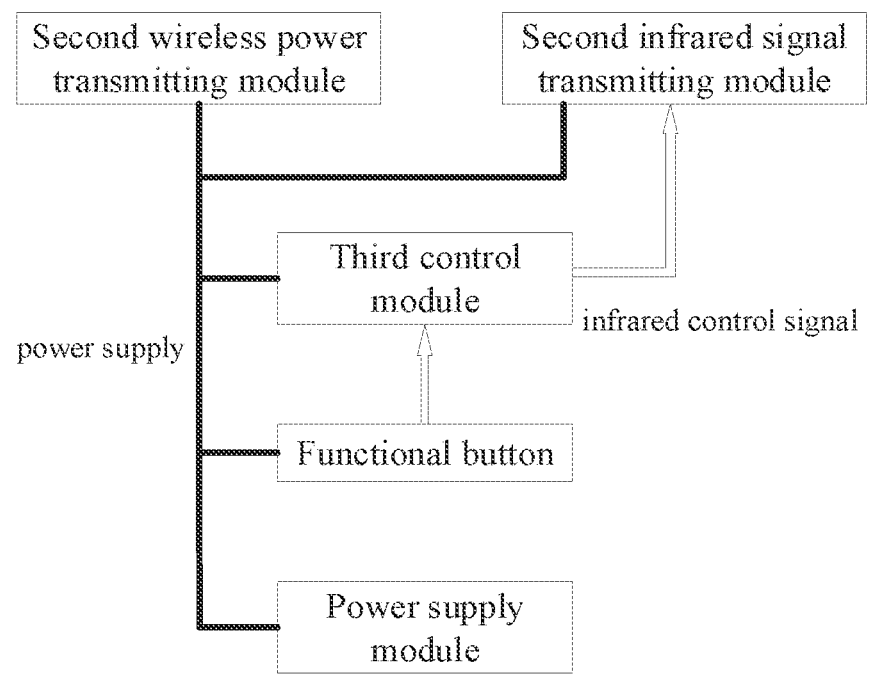
FIG. 3 is a structural diagram of an encoder of the wireless lamp system with an infrared coding function provided by the first embodiment of the application.

First, as shown in FIG. 1. FIG. 2 and FIG. 3, a first embodiment of the application provides a wireless lamp system with an infrared coding function, which comprises a wireless lamp, a lamp holder and an encoder, wherein the lamp holder is configured for supplying power to the wireless lamp and transmitting an infrared control signal to drive the wireless lamp to change emitted light, the encoder is configured for transmitting an infrared coded signal, multiple manufacturer controller protocols are integrated in the wireless lamp, and the wireless lamp analyses the infrared coded signal and then selectively changes the current manufacturer controller protocol into the manufacturer controller protocol corresponding to the analysed infrared coded signal to analyse the infrared control signal received from the lamp holder.

Specifically, as shown in FIG. 1, the wireless lamp comprises an LED lamp bead (LED in FIG. 1), an LED drive module, a first control module, an infrared signal receiving module and a wireless power receiving module, wherein the infrared signal receiving module is matched with the first control module to receive and analyse the infrared control signal/infrared coded signal transmitted from the lamp holder/encoder, the first control module outputs a PWM control signal or switches the manufacturer protocol according to an analysis result, and the LED drive module receives the PWM control signal to drive the LED lamp bead to change emitted light. It can be understood that the first control module can be an MCU configured for receiving the infrared signal and outputting the PWM control signal.

Specifically, the infrared signal receiving module receives the infrared control signal transmitted from the lamp holder, the infrared control signal is processed correspondingly and then transmitted to the first control module to be analysed, and the first control module outputs the PWM control signal to the LED drive module according to the analysis result to drive the LED lamp bead to change emitted light. The infrared signal receiving module receives the infrared coded signal transmitted from the encoder, the infrared coded signal is processed correspondingly and then transmitted to the first control module to be analysed, and the first control module selectively changes the manufacturer controller protocol to be executed by the wireless lamp according to the analysis result.

As shown in FIG. 1 and FIG. 2, the lamp holder is electrically connected to an external power supply, and comprises a first wireless power transmitting module, a first infrared signal transmitting module and a second control module which are connected to the external power supply, the first wireless power transmitting module is matched with the wireless power receiving module to activate the wireless lamp, the second control module converts a light control signal into the infrared control signal and then transmits the infrared control signal to the wireless lamp through the first infrared signal transmitting module, and the infrared control signal is received by the infrared signal receiving module of the wireless lamp.

Preferably, the first wireless power transmitting module comprises a first transmitting coil and a drive circuit, and the wireless power receiving module comprises a receiving coil corresponding to the first transmitting coil; when the wireless lamp is positioned in a wireless trigger area of the lamp holder, electromagnetic induction occurs between the first transmitting coil and the receiving coil, such that the receiving coil generates induced current to realize wireless power transmission; and the first infrared signal transmitting module is wirelessly connected to the infrared signal receiving module, such that the infrared signal receiving module can receive the infrared control signal transmitted from the lamp holder.

The lamp holder is also electrically connected to a controller, the controller is electrically connected to the second control module of the lamp holder and is configured for compiling and transmitting the light control signal to control the colour, brightness and other parameters of light emitted by the wireless lamp. Further, the controller comprises a preset number of light selection buttons, each light selection button correspondingly outputs one light control signal, and each light control signal corresponds to one light effect; when one light selection button is selected, the controller outputs a light control signal corresponding to the light selection button, the second control module receives the light control signal, converts the light control signal into an infrared control signal, and transmits the infrared control signal to the wireless lamp through the first infrared signal transmitting module, the infrared control signal is received by the infrared signal receiving module of the wireless lamp, the infrared signal receiving module transmits the infrared control signal to the first control module, which analyses the infrared control signal into a corresponding PWM signal, and the LED drive module drives the LED lamp bead to emit light corresponding to the light effect.

As shown in FIG. 1 and FIG. 3, the encoder comprises a power supply module, and a second wireless power transmitting module, a second infrared signal transmitting module and a third control module which are electrically connected to the power supply module, the second wireless power transmitting module is matched with the wireless power receiving module to activate the wireless lamp to supply power to the wireless lamp, protocol selection signals are preset in the third control module, and the third control module transmits the protocol selection signal to the wireless lamp in the form of an infrared coded signal through the second infrared signal transmitting module.

Preferably, the second wireless power transmitting module comprises a second transmitting coil corresponding to the receiving coil; when the wireless lamp is positioned in a wireless trigger area of the encoder, electromagnetic induction occurs between the second transmitting coil and the receiving coil, such that the receiving coil generates induced current to realize wireless power transmission; and the second infrared signal transmitting module is wirelessly connected to the infrared signal receiving module, such that the infrared signal receiving module can receive the infrared coded signal transmitted from the encoder.

The encoder further comprises a preset number of functional buttons electrically connected to the third control module, and each of the functional buttons is connected to the third control module and correspondingly outputs one protocol selection signal preset in the third control module. Further, manufacturer protocols in one-to-one correspondence with the protocol selection signals are preset in the first control module of the wireless lamp. When users write a code with the encoder, one functional button is selected as required, the functional button correspondingly outputs one protocol selection signal preset in the third control module, the third control module converts the protocol selection signal correspondingly output by the function button into an infrared coded signal, the infrared coded signal is transmitted by the second infrared signal transmitting module to the first control module to be analysed, and the first control module the first control module compares the protocol selection signal analysed from the infrared coded signal with the manufacturer protocols stored in the first control module one by one to select the corresponding manufacturer protocol.

Figure 4:
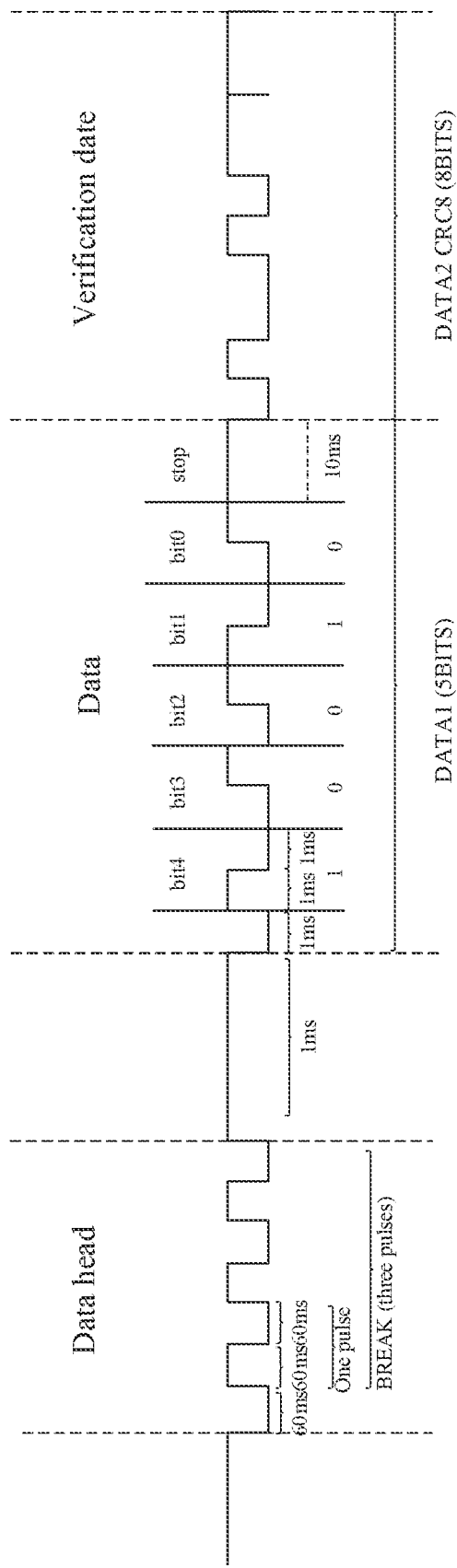
FIG. 4 is a schematic diagram of the format of an infrared coded signal output by the encoder of the wireless lamp system with an infrared coding function provided by the first embodiment of the application.

Preferably, as shown in FIG. 4, the infrared coded signal comprises a data head, data and verification data. In this embodiment, the data head is specifically a piece of 6 Bits data with a fixed value and comprises three continuous pulses, and each pulse sequentially comprises a 60 ms high level and a 60 ms low level, such that the data head can be easily recognized by the lamp to start a receiving program. The data is specifically a piece of 5 bits data and comprises manufacturer protocol information carried by the protocol selection signal. The verification data is specifically a piece of 8 Bits data obtained by verifying the data head and the data through a CRC8 algorithm.

According to the wireless lamp system with an infrared coding function, multiple manufacturer controller protocols are integrated in one wireless lamp, and the corresponding manufacturer protocol is selected by changing the configuration of the LED lamp. Specifically, the infrared signal receiving module is configured in the wireless lamp, the encoder equipped with the infrared signal transmitting module is configured for writing corresponding codes, an infrared coded signal with coding information is transmitted to the wireless lamp, the wireless lamp analyses the infrared coded signal through the first control module and selects the corresponding manufacturer protocol according to the analysis result to realize quick change of the protocol, such that the wireless lamp system is more universal and more convenient to use.

The above embodiments are merely preferred ones of the invention. It should be pointed out that these preferred embodiments should not be construed as limitations of the invention, and the protection scope of the invention should be defined by the claims. Those ordinarily skilled in the art can make some improvements and embellishments without departing from the spirit and scope of the invention, and all these improvements and embellishments should also fall within the protection scope of the invention.

What is claimed is:

1. A wireless lamp system with an infrared coding function, comprising a wireless lamp, a lamp holder and an encoder, the lamp holder being configured for supplying power to the wireless lamp and transmitting an infrared control signal to drive the wireless lamp to change emitted light, the encoder being configured for sending an infrared coded signal, and the wireless lamp analysing the infrared coded signal and then selectively changing a manufacturer protocol to analyse the infrared control signal received from the lamp holder, wherein:

the wireless lamp comprises an LED lamp bead, an LED drive module, a first control module, an infrared signal receiving module and a wireless power receiving module, the infrared signal receiving module is matched with the first control module to receive and analyse the infrared control signal/infrared coded signal transmitted from the lamp holder/encoder, the first control module outputs a PWM control signal or changes the manufacturer protocol according to an analysis result, and the LED drive module receives the PWM control signal to drive the LED lamp bead to change emitted light;

the lamp holder is electrically connected to an external power supply, and comprises a first wireless power transmitting module, a first infrared signal transmitting module and a second control module, the first wireless power transmitting module is matched with the wireless power receiving module to activate the wireless lamp, and the second control module converts a light control signal into the infrared control signal and then transmits the infrared control signal to the wireless lamp through the first infrared signal transmitting module;

the encoder comprises a power supply module, and a second wireless power transmitting module, a second infrared signal transmitting module and a third control module which are electrically connected to the power supply module, the second wireless power supply module is matched with the wireless power receiving module to activate the wireless lamp, protocol selection signals are preset in the third control module, and the third control module transmits one protocol selection signal to the wireless lamp in the form of the infrared coded signal through the second infrared signal transmitting module.

2. The wireless lamp system with an infrared coding function according to claim 1, wherein the encoder is provided with a preset number of functional buttons, and each of the functional buttons is linked with the third control module and correspondingly outputs one protocol selection signal preset in the third control module.

3. The wireless lamp system with an infrared coding function according to claim 2, wherein manufacturer protocols in one-to-one correspondence with the protocol selection signals are preset in the first control module of the wireless lamp, and the first control module selects the corresponding manufacturer protocol according to the protocol selection signal analysed from the infrared coded signal.

4. The wireless lamp system with an infrared coding function according to claim 1, wherein the lamp holder is electrically connected to a controller, and the controller is used for compiling and transmitting the light control signal.

5. The wireless lamp system with an infrared coding function according to claim 1, wherein the infrared coded signal comprises a data head, data and verification data.

6. The wireless lamp system with an infrared coding function according to claim 5, wherein the data head comprises three continuous pulses, and each of the pulses sequentially comprises a 60 ms high level and a 60 ms low level.

* * * * *